No. 783,395. PATENTED FEB. 21, 1905.
J. L. ASHURST.
FURROW OPENER FOR SEEDING MACHINES.
APPLICATION FILED DEC. 17, 1904.

Witnesses.
Nora Graham.
Ina Graham.

Inventor,
John L. Ashurst.
by L. P. Graham
his attorney.

No. 783,395. Patented February 21, 1905.

UNITED STATES PATENT OFFICE.

JOHN L. ASHURST, OF HAVANA, ILLINOIS, ASSIGNOR TO LEWIS B. ASHURST, OF KILBOURNE, ILLINOIS.

FURROW-OPENER FOR SEEDING-MACHINES.

SPECIFICATION forming part of Letters Patent No. 783,395, dated February 21, 1905.

Application filed December 17, 1904. Serial No. 237,292.

*To all whom it may concern:*

Be it known that I, JOHN L. ASHURST, of the city of Havana, county of Mason, and State of Illinois, have invented a certain new and useful Furrow-Opener for Seeding-Machines, of which the following is a specification.

This invention relates to furrow-opening disks for drills, planters, and the like, and the object is to provide means for depositing the seed in the bottom of the furrow formed by the disk.

It has been customary heretofore in the use of furrow-forming disks to drop the seed through chutes located in the rear of the axes of the disks, and it has been practically impossible to get all or even a great deal of the seed to the deepest part of the furrows. The seed tends to fall to the rear of the vertical center of the disks through this form of chute, and this tendency is increased by the travel of the planter. Moreover, the seed is usually directed toward the surface of the disk, a great deal of the seed will strike the disk in falling whether the result is designed or not, and the tendency of the disk's action is to throw the seed upward and rearward, because the surface contacted with is traveling that way. A disk furrow-former does not leave solid side walls, the displaced soil is loose and crumbly ordinarily, and the furrow fills to a greater or less extent immediately behind the lowest edge of the disk. The seed falling to the rear of the center of the disk finds the furrow partly filled by crumbling soil, and the grains thrown upward and backward by contact with the disk strike the soil where the furrow is still further filled.

I overcome the deficiencies hereinbefore enumerated by delivering the seed in front of the center of the disk and directing it toward the inner surface of the front edge of the disk. By this means the seed contacts with the disk above the bottom of the furrow at a point that is descending and is lowered to the bottom of the furrow as the furrow is formed.

The idea is applicable to either a single-disk furrow-opener or to a double-disk furrow-opener; but in a single-disk opener the guard-plate is extended forward to the point at which the seed tends to strike the disk. Means are provided for forming a seed-channel to the rear of the front edge of the disk, and such means may comprise two disks or a disk and a guard-plate.

Figure 1:
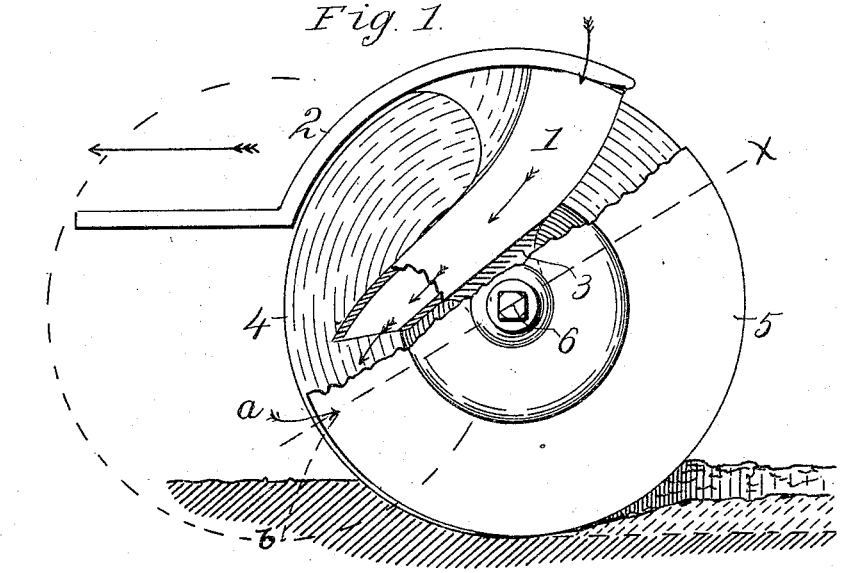
Figure 2:
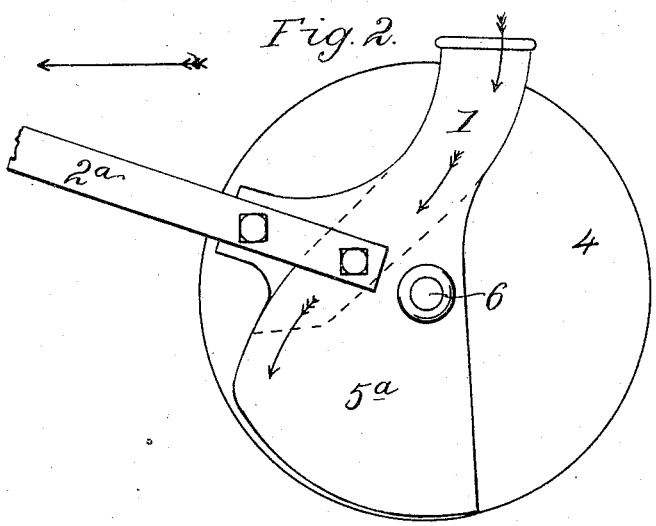
Figure 3:
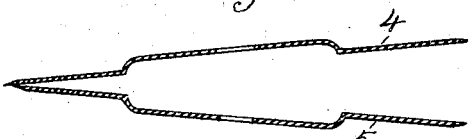

In the drawings forming part of this specification, Figure 1 is a side elevation of a double-disk furrow-opener embodying my invention, parts being broken away to expose interiors. Fig. 2 is a side elevation of a single-disk furrow-opener in which my invention is embodied, and Fig. 3 is a section through the disks on line X in Fig. 1.

A pair of disks is shown at 4 and 5, and the axis of the disks is shown at 6. The chute for the seed is shown at 1, a draft-beam is shown at 2, and at 3 is shown the connection between the chute and the journals of the disks.

The chute has its receiving end above and slightly to the rear of the centers of the disks. In the present construction it inclines downward and forward in lines designed to facilitate travel of the seed, and it terminates in front of the axis of the disks with its discharge end presented toward the inner surfaces of the front edges of the disks at what is preferably the closest approach of the disks to one another.

Seed striking the disk at the head of arrow *a* while the furrow-opener is in action will follow the dotted line to point *b* by the time the disk or disks have reached the position shown by dotted lines, and will therefore be deposited in the deepest part of the furrow at the very instant the furrow is formed. The disks are close together at the point the seed strikes; but they separate as they descend or as the point descends, and by the time the seed is carried to the lowest point they are far enough apart to permit the discharge of the seed into the furrow. What happens with reference to point *a* also happens to all other points in the perimeter of the disk, and a continuous stream of seed is in the case of a drill falling against the disk above the bottom of the furrow in advance of the completed furrow and being lowered to the bottom of the furrow by the furrow-forming rotation of the disk.

In Fig. 2 a stationary shield 5ª takes the place of disk 5, and a draft-beam 2ª is substituted for beam 2. In this embodiment of my invention the shield coacts with the disk 4 to form a seed-receiving channel, the shield moves forward as the seed descends, and the single disk lowers the seed into the furrow while cutting the furrow open.

The invention is applicable to grain-drills, corn-planters, and other seeders.

What I claim as new, and desire to secure by Letters Patent, is—

1. In a furrow-opener for seeders, the combination, with a furrow-forming disk, of means for discharging seed into the furrow in front of the center of the disk.

2. In a furrow-opener for seeders, the combination, with a furrow-forming disk, of means for discharging seed in front of the center of the disk and toward the inner surface of the front edge of the disk.

3. In a furrow-opener for seeders, the combination, with a furrow-forming disk, of means for discharging seed downward and forward toward the front edge of the disk.

4. In a furrow-opener for seeders, the combination of a furrow-forming disk, a surface opposed to the front edge of the disk to form a seed-receiving channel, and a chute to deliver seed into the channel.

5. In a furrow-opener for seeders, the combination of a pair of furrow-forming disks journaled obliquely with their front edges contiguous, and a chute inclined to deliver seed into the channel formed by the contiguous surfaces of the disks.

In testimony whereof I sign my name in the presence of two subscribing witnesses.

JOHN L. ASHURST.

Witnesses:
JOHN W. PITMAN,
J. H. NASH.